H. BALL.
Oven.
No. 4,026. Reissued June 14, 1870.
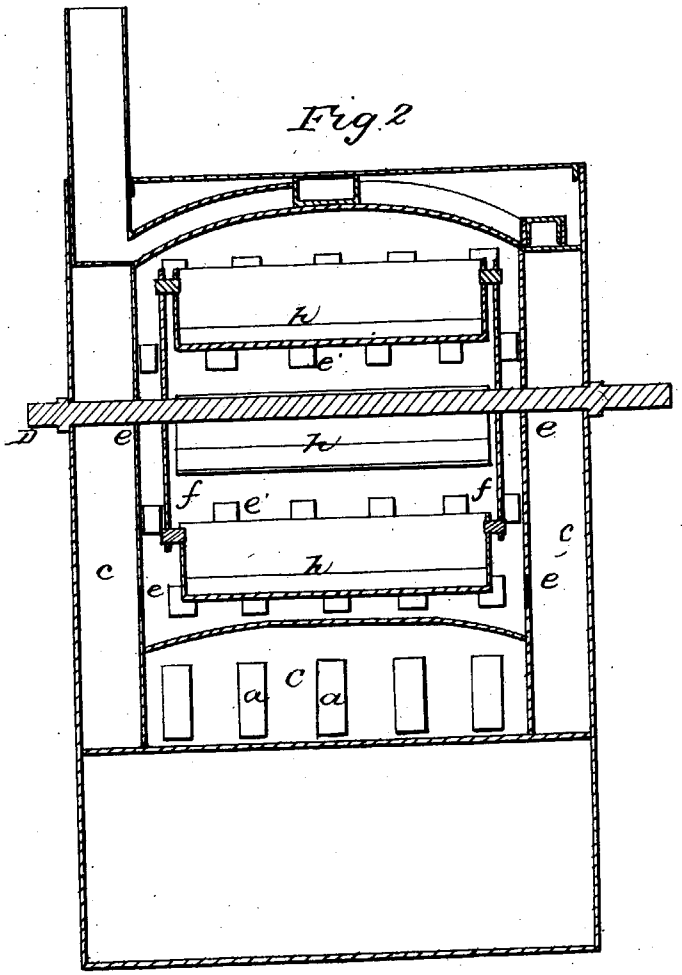
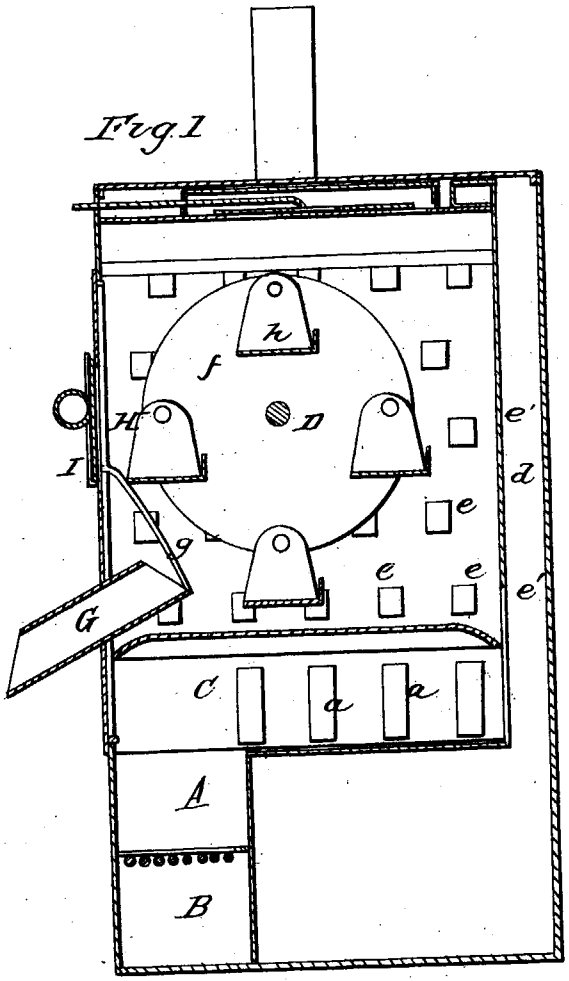
N. PETERS, Photo-Lithographer, Washington, D. C.

UNITED STATES PATENT OFFICE.

HOSEA BALL, OF NEW YORK, N. Y.

OVEN.

Specification forming part of Letters Patent No. 15,753, dated September 23, 1856; reissue No. 3,666, dated October 12, 1869; reissue No. 4,026, dated June 14, 1870.

Be it known that I, HOSEA BALL, of the city, county, and State of New York, have invented a new and useful Improvement in Ovens, of which the following is a description:

*Nature and Objects of the Invention.*

My oven is constructed with a series of bread-receiving tables or shelves suspended from a reel revolving within a chamber, into or through which the direct heat from the furnace is passed and properly distributed.

*Description with Reference to the Drawing.*

The accompanying drawing is a sectional view, illustrating my invention. Figure 1 is a vertical transverse section. Fig. 2 is a vertical section in a plane coincident with the axis of the reel.

Like letters of reference indicate corresponding parts in both views.

A represents the fuel-receptacle of furnace, B the ash-pit, and C the combustion-chamber, which communicates directly or indirectly, in any proper manner, with the chamber in which the bread-receiving shelves or platforms *h* are revolved. D represents the shaft, and *f* the ends or arms of a reel, by which the shelves *h* are suspended and revolved. The flues *c d* and openings *a e e'* to permit the passage or circulation of gases into or through the bread-chamber may be located and arranged in any effective manner; and any suitable system of dampers may be employed to regulate the course or strength of the draft. In front of the oven is an opening, H, employed for the introduction of the bread, and closed by a door, I. A chute, G, may be used for the discharge of bread, and the discharge may be made automatic by guides *g*, with which the edges of the shelves or platforms *h* will come in contact as the reel revolves, so as to incline the said shelves to the same angle as the chute.

The chute is to be closed by a suitable door during the baking operation.

*Operation.*

The shelves or platforms *h* are each, in succession, brought opposite the opening H by the rotation of the shaft D, and a supply of bread placed upon them. The doors are then closed and the baking commenced.

The reel may be rotated as required during the baking operation to apply an equal heat to the bread upon the several shelves or platforms.

When the baking is completed the bread may be withdrawn from each platform in succession through the opening H; or, if preferred, it may be discharged, either automatically or otherwise, through the chute G.

*Claims.*

I claim as my invention—

1. One or more swinging bread-holders suspended from the arms or end plates of a rotating reel, in combination with a furnace so arranged and connected that the products of combustion will pass into or through the chamber within which the bread-holders move.

2. In combination with a rotating reel and swinging bread-holders, a flue on one or more sides of the chamber in which the reel rotates, communicating with said chamber through apertures in the wall between them.

3. In combination with a swinging bread-holder revolving in an oven, a discharging-chute and tripping device, by which the bread is delivered from its platform and into the chute, substantially as and for the purposes described.

HOSEA BALL.

Witnesses:

EDWARD H. KNIGHT,
JAS. MELDRUM.